(12) United States Patent
Sheppard et al.

(10) Patent No.: US 12,556,377 B2
(45) Date of Patent: Feb. 17, 2026

(54) INTERNAL KEY MANAGEMENT FOR A STORAGE SUBSYSTEM ENCRYPTING DATA IN THE CLOUD

(71) Applicant: International Business Machines Corporation, Armonk, NY (US)

(72) Inventors: Jacob Lee Sheppard, Corona De Tucson, AZ (US); Samantha A. Utter, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 17/399,002

(22) Filed: Aug. 10, 2021

(65) Prior Publication Data
US 2023/0052663 A1   Feb. 16, 2023

(51) Int. Cl.
*H04L 9/08* (2006.01)
*H04L 9/40* (2022.01)

(52) U.S. Cl.
CPC ............ *H04L 9/085* (2013.01); *H04L 9/0861* (2013.01); *H04L 63/166* (2013.01)

(58) Field of Classification Search
None
See application file for complete search history.

(56) References Cited

U.S. PATENT DOCUMENTS

| | | | |
|---|---|---|---|
| 9,380,036 B2 | 6/2016 | Parann-Nissany | |
| 9,432,183 B1* | 8/2016 | Axnix | H04L 9/0822 |
| 9,767,318 B1* | 9/2017 | Dropps | G06F 21/72 |
| 9,853,811 B1* | 12/2017 | Levy | H04L 9/088 |
| 10,033,703 B1* | 7/2018 | Sharifi Mehr | H04L 63/0428 |
| 10,623,386 B1* | 4/2020 | Bernat | H04L 63/061 |
| 11,431,488 B1* | 8/2022 | Sapuntzakis | H04L 9/085 |
| 2003/0093663 A1* | 5/2003 | Walker | H04L 9/3271 |
| | | | 713/150 |
| 2004/0153642 A1* | 8/2004 | Plotkin | H04L 63/0442 |
| | | | 713/150 |
| 2012/0173885 A1* | 7/2012 | Acar | G06F 21/602 |
| | | | 713/193 |

(Continued)

OTHER PUBLICATIONS

Gopal et al. "Low-Cost Distributed Key Management" IEEE, 57-58 (Year: 2018).*

(Continued)

*Primary Examiner* — Amir Mehrmanesh
*Assistant Examiner* — Shadi H Kobrosli
(74) *Attorney, Agent, or Firm* — Eric W. Chesley

(57) ABSTRACT

A method for sharing data encryption keys among a plurality of storage systems is disclosed. The method generates, by a first storage system, a data encryption key for encrypting data sent from the first storage system to cloud storage. The method stores the encrypted data in the cloud storage in the form of an encrypted data object. In certain embodiments, the first storage system stores an Internet Protocol (IP) address of a second storage system belonging to a same key sharing network as the first storage system. The method replicates, from the first storage system to the second storage system, the data encryption key. The second storage system retrieves the encrypted data object from the cloud storage and decrypts the encrypted data in the encrypted data object using the data encryption key received from the first storage system.

25 Claims, 11 Drawing Sheets

(56) References Cited

U.S. PATENT DOCUMENTS

| | | | |
|---|---|---|---|
| 2013/0259234 A1* | 10/2013 | Acar | H04L 9/088 |
| | | | 380/278 |
| 2014/0095881 A1* | 4/2014 | Chan | G06F 16/125 |
| | | | 713/171 |
| 2014/0185808 A1* | 7/2014 | Movassaghi | H04L 63/061 |
| | | | 380/278 |
| 2014/0281520 A1* | 9/2014 | Selgas | G06F 21/6209 |
| | | | 713/165 |
| 2015/0365232 A1* | 12/2015 | Yang | H04L 9/3231 |
| | | | 380/286 |
| 2017/0346625 A1* | 11/2017 | Yan | G06F 21/602 |
| 2018/0034787 A1* | 2/2018 | Kamaraju | H04L 63/0435 |
| 2019/0229902 A1* | 7/2019 | Zheng | H04L 9/0861 |
| 2020/0177382 A1* | 6/2020 | Perlman | H04L 9/14 |
| 2020/0396070 A1* | 12/2020 | Rubin | H04L 9/0825 |
| 2021/0160340 A1* | 5/2021 | Narayanan | H04L 67/53 |
| 2022/0006627 A1* | 1/2022 | Ko | H04L 9/0852 |
| 2022/0069981 A1* | 3/2022 | Jog | H04L 9/0861 |
| 2022/0200800 A1* | 6/2022 | Xu | H04L 9/0822 |
| 2022/0231848 A1* | 7/2022 | Zhang | H04L 9/0822 |
| 2023/0169490 A1* | 6/2023 | Nelms | G06Q 20/3278 |
| | | | 705/21 |
| 2023/0254127 A1* | 8/2023 | Bernat | H04L 9/0897 |
| | | | 713/171 |
| 2024/0056290 A1* | 2/2024 | Wilson | H04L 9/0897 |

OTHER PUBLICATIONS

Gopal, et al. "Low-Cost Distributed Key Management," 2018 IEEE World Congress on Services, 2018, vol. 1, pp. 57-58.

* cited by examiner

INTERNAL KEY MANAGEMENT FOR A STORAGE SUBSYSTEM ENCRYPTING DATA IN THE CLOUD

BACKGROUND

Field of the Invention

This invention relates to systems and methods for sharing data encryption keys among multiple storage systems.

Background of the Invention

Over the last number of years, online data privacy has taken on an increasingly important role in the field of information technology. The transition from analog to digital data has provided myriad advantages but also leaves data more susceptible to risks and vulnerabilities. Just a short time ago, a data breach that compromised the data of a few million people would have been a big news story. Now, data breaches that affect hundreds of millions or even billions of people are commonplace.

One of the most effective tools to protect data is encryption, particularly when data is stored in the cloud. Storing data in the cloud has become increasing prevalent over the last number of years. Using the cloud along with a cloud storage provider, users are able to log in from almost any location in the world having Internet access to upload and/or retrieve their data.

Cloud encryption is the process of encoding or transforming data before its transferred to the cloud. Encryption uses mathematical algorithms to transform data (e.g., plaintext, code, image data, etc.) into an unreadable form (ciphertext) that can conceal the nature of the data from unauthorized or malicious users. It is the simplest and most straightforward way to ensure that cloud data is protected and can't be breached, stolen, or accessed by an unauthorized individual.

SUMMARY

The invention has been developed in response to the present state of the art and, in particular, in response to the problems and needs in the art that have not yet been fully solved by currently available systems and methods. Accordingly, systems and methods have been developed for sharing data encryption keys among a plurality of storage systems. The features and advantages of the invention will become more fully apparent from the following description and appended claims, or may be learned by practice of the invention as set forth hereinafter.

Consistent with the foregoing, a method for sharing data encryption keys among a plurality of storage systems is disclosed. The method generates, by a first storage system, a data encryption key for encrypting data sent from the first storage system to cloud storage. The method stores the encrypted data in the cloud storage in the form of an encrypted data object. In certain embodiments, the first storage system stores an Internet Protocol (IP) and port address of a second storage system belonging to a same key sharing network as the first storage system. The method replicates, from the first storage system to the second storage system, the data encryption key. The second storage system retrieves the encrypted data object from the cloud storage and decrypts the encrypted data in the encrypted data object using the data encryption key received from the first storage system.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
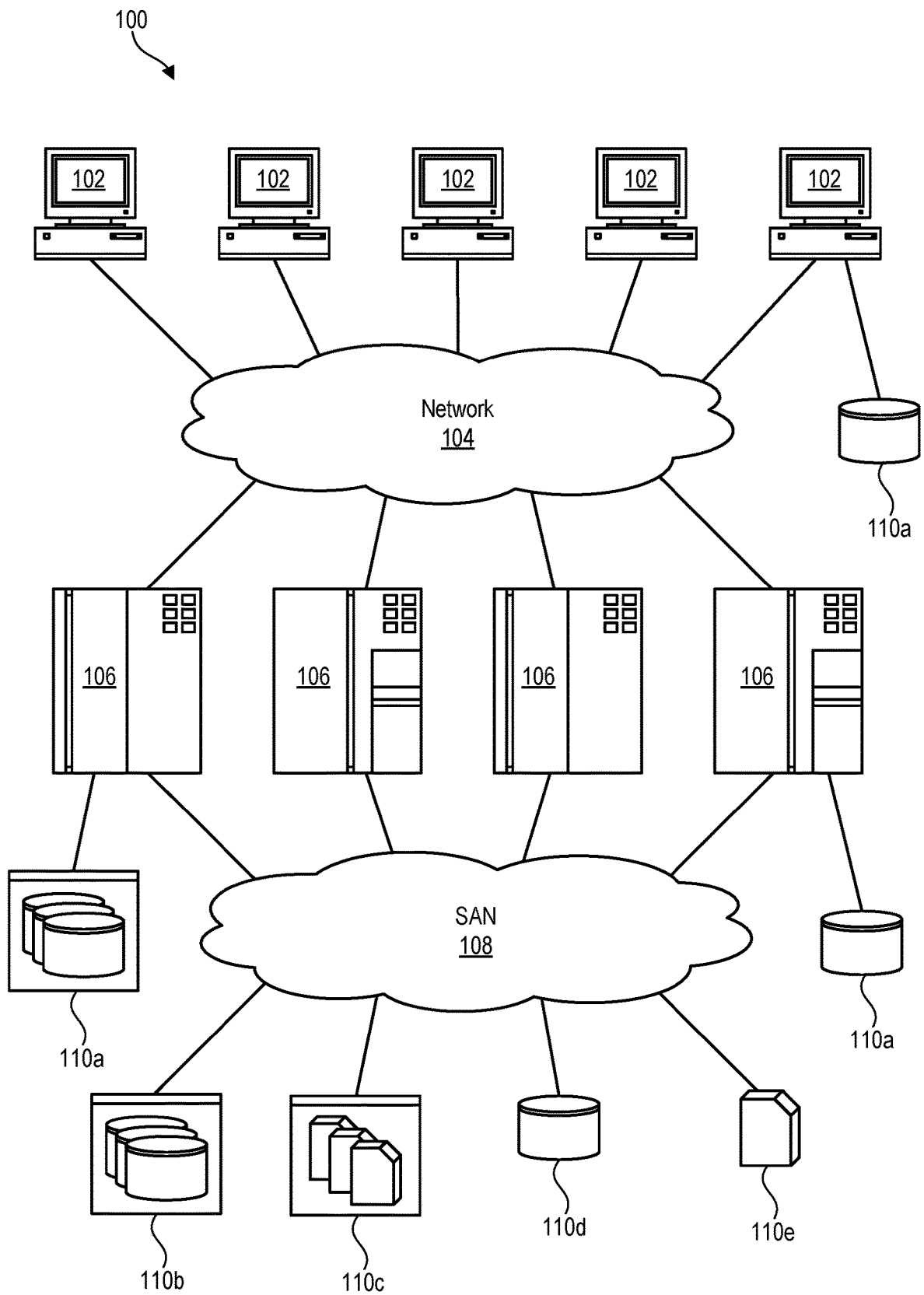
FIG. 1 is a high-level block diagram showing one example of a network environment in which embodiments of the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment in which systems and methods in accordance with the invention may be implemented. The network environment 100 is presented by way of example and not limitation. Indeed, the systems and methods disclosed herein may be applicable to a wide variety of different network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 110a (e.g., arrays of hard-disk drives, solid-state drives, tape drives, etc.). These computers 102, 106 and direct-attached storage systems 110a may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110b of hard-disk drives or solid-state drives, tape libraries 110c, individual hard-disk drives 110d or solid-state drives 110d, tape drives 110e, CD-ROM libraries, or the like. To access a storage system 110, a host system 106 may communicate over physical connections from one or more ports on the host system 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
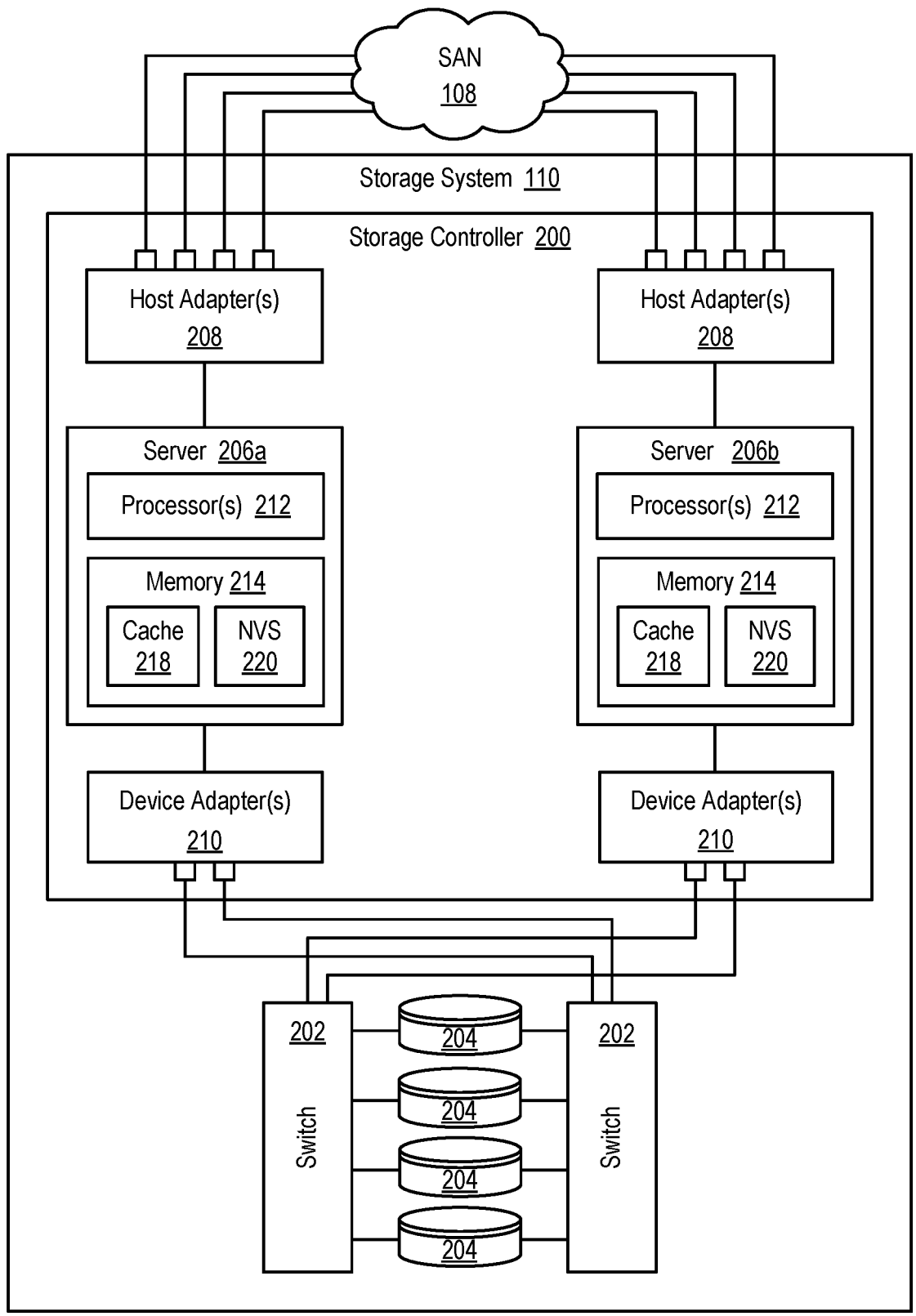
FIG. 2 is a high-level block diagram showing one example of a storage system for use in the network environment of FIG. 1.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more host systems 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host systems 106 and storage drives 204, respectively. Multiple servers 206a, 206b may provide redundancy to ensure that data is always available to connected host systems 106. Thus, when one server 206a fails, the other server 206b may pick up the I/O load of the failed server 206a to ensure that I/O is able to continue between the host systems 106 and the storage drives 204. This process may be referred to as a "failover."

In selected embodiments, each server 206 includes one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

In selected embodiments, the memory 214 includes a cache 218, such as a DRAM cache 218. Whenever a host system 106 (e.g., an open system or mainframe server 106) performs a read operation, the server 206 that performs the read may fetch data from the storages drives 204 and save it to its cache 218 in the event it is required again. If the data is requested again by a host system 106, the server 206 may fetch the data from the cache 218 instead of fetching it from the storage drives 204, saving both time and resources. Similarly, when a host system 106 performs a write, the server 106 that receives the write request may store the write in its cache 218, and destage the write to the storage drives 204 at a later time. When a write is stored in cache 218, the write may also be stored in non-volatile storage (NVS) 220 of the opposite server 206 so that the write can be recovered by the opposite server 206 in the event the first server 206 fails. In certain embodiments, the NVS 220 is implemented as battery-backed memory in the opposite server 206.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented by way of example and is not intended to be limiting.

Figure 3:
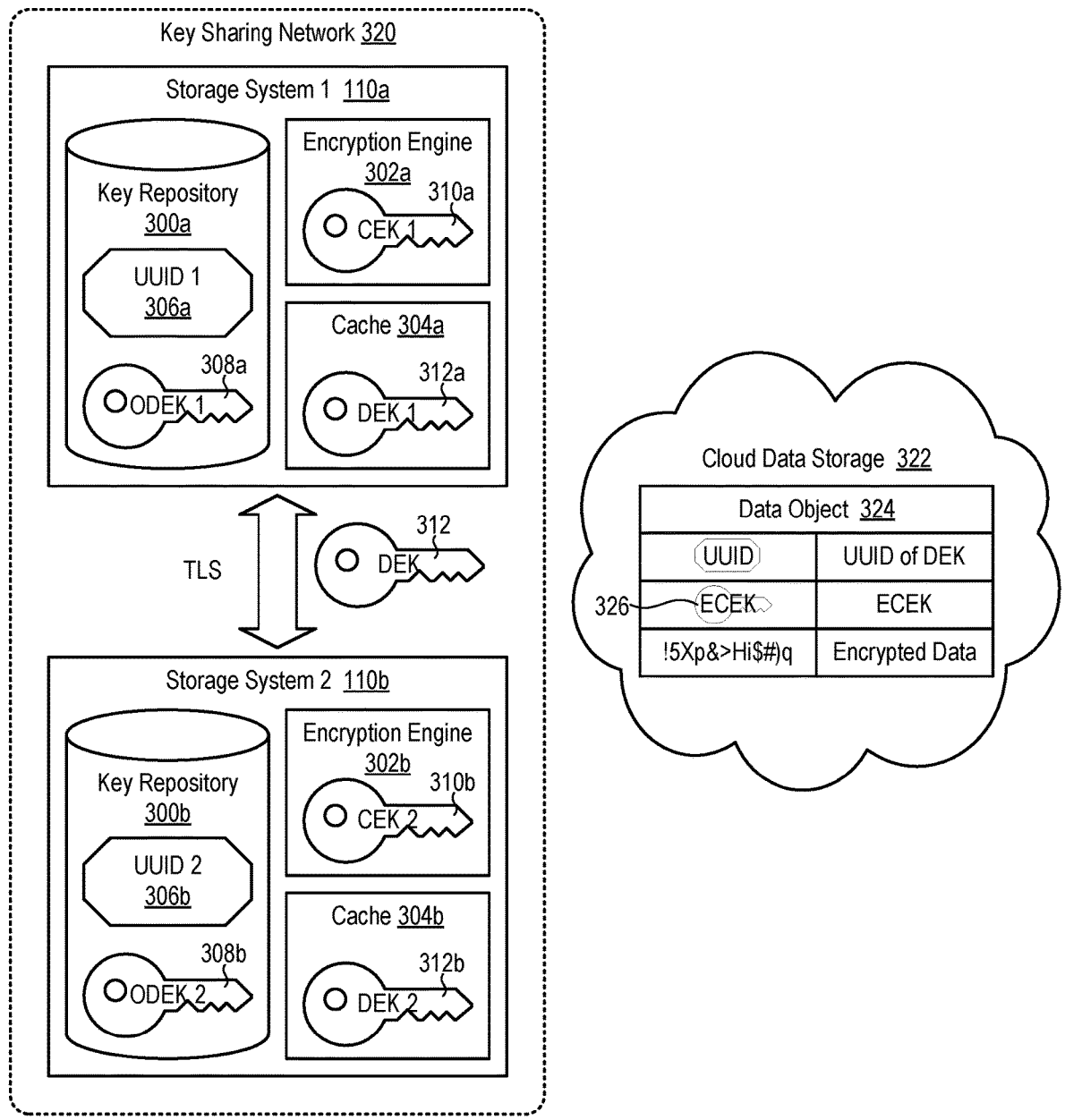
FIG. 3 is a high-level block diagram showing multiple storage systems in a key sharing network.

Referring to FIG. 3, in certain embodiments, a storage system 110 like that illustrated in FIG. 2 may be configured to store (i.e., backup, archive, etc.) data in cloud data storage 322 provided by a cloud service provider. In certain embodiments, in order to protect data from unauthorized users, the storage system 110 may encrypt the data prior to sending it to the cloud 322. This encrypted data may be encapsulated in what is referred to herein as a data object 324 or cloud object 324.

In certain embodiments, data encryption keys 312 may be used to encrypt data that is sent to the cloud 322. In conventional systems, data encryption key 312 may be generated and retrieved from a key server that is external to the storage systems 110. However, systems and methods in accordance with the invention may eliminate the key server and replace the key server with a key sharing network 320 made up of a plurality of storage systems 110 that generate their own data encryption keys 312 and share the data encryption keys 312 with each other. This may reduce upfront and maintenance costs associated with a key server, as well as reduce complexity while still enabling user to protect data that is sent to the cloud 322.

As shown, the key sharing network 320 may include a plurality of storage systems 110 (e.g., storage system 110a and storage system 110b) that are configured to share data encryption key 312 with one another. For the sake of simplicity, the key sharing network 320 is shown with only a pair of storage systems 110, although the key sharing network 320 may include additional storage systems 110 in other embodiments. As shown, each storage system 110 may include a persistent key repository 300, an encryption engine 302, and a cache 304 (such as the cache 218 described in FIG. 2) that may perform various roles in encrypting/decrypting data and sharing data encryption keys 312 across storage systems 110 in the key sharing network 320.

A data encryption key 312 may, in certain embodiments, include a unique universal identifier (UUID) 306, a signature, and other attributes. The UUID 306 may be used to uniquely identify the data encryption key 312. When a storage system 110 needs to send data in an encrypted format to the cloud storage 322, the storage system 110 may generate a data encryption key 312. This data encryption key 312 may be used to wrap and unwrap other keys that are used to encrypt data that is sent to the cloud 322. For example, the data encryption key 312 may be used to wrap (i.e., encrypt) a cloud encryption key (CEK) 310 that is generated by an encryption engine 302 on the storage system 110 to encrypt and decrypt data that is sent to the cloud 322. A new cloud encryption key 310 may be generated for each data object 324 that is stored in the cloud 322. The cloud encryption key 310 that is wrapped by the data encryption key 312 may be referred to herein as an encrypted cloud encryption key (ECEK) 326. This encrypted cloud encryption key 326 may be stored in the data object 324 along with the UUID 306 and the encrypted data.

As shown, each of the storage systems 110a, 110b includes a key repository 300 that is used to store locally generated data encryption keys 312 as well as data encryption keys 312 of other storage systems 110 in the key sharing network 320. In certain embodiments, these data encryption key 312 are stored in the form of obfuscated data encryption keys (ODEKs) 308, which are basically just the data encryption keys 312 themselves in an obfuscated format that make them difficult to decipher. This provides an extra layer of security and protection to the data encryption keys 312. In addition, the key repository 300 may store the UUIDs 306 associated with the obfuscated data encryption keys 308.

As further shown in FIG. 3, the data encryption keys 312 of a storage system 110 as well as other storage systems 110 in the key sharing network 320 may be stored in cache 304 of the storage systems 110 so that they are readily available for encrypting/decrypting data. When a storage system 110 generates a new data encryption key 312, the storage system 110 may communicate the new data encryption key 312 to other storage systems 110 in the key sharing network 320 over a secure connection or public key infrastructure, such as Transport Layer Security (TLS). The old data encryption keys 312 of the storage systems 110 of the key sharing network 320 may also be retained in each of the storage systems 110 of the key sharing network 320 since these may be needed to decrypt data objects 324 previously stored in the cloud 322. By maintaining the data encryption keys 312 and UUIDs 306 of all the storage systems 110 of the key sharing network 320 in each of the storage systems 110 of the key sharing network 320, every storage system 110 in the key sharing network 320 is able to decrypt any data object 324 in the cloud data storage 322, regardless of which storage system 110 encrypted the data.

In order to communicate with one another and replicate data encryption keys 312 therebetween, each storage system 110 in the key sharing network 320 may store the Internet Protocol (IP) and port addresses of all other storage systems 110 in the key sharing network 320. Furthermore, each storage system 110 in the key sharing network 320 may, in certain embodiments, include a trust store for holding public key certificates of the other storage systems 110 in the key sharing network 320.

In certain embodiments, security in the key sharing network 320 may be maintained as follows: Encrypted data in the cloud 322 is separated from the data encryption keys 312 stored in the storage systems 110 of the key sharing network 320. The key sharing network 320 may utilize a Public Key Infrastructure for communicating data encryption keys 312 between the storage systems 110 of the key sharing network 320. Optionally, storage systems 110 in the key sharing network 320 may utilize a Trusted Platform Module and/or Hardware Security Module to securely store a master key. This master key may be used to encrypt data encryption keys 312 (or obfuscated data encryption keys 308) that are stored in the key repositories 300.

Figure 4:
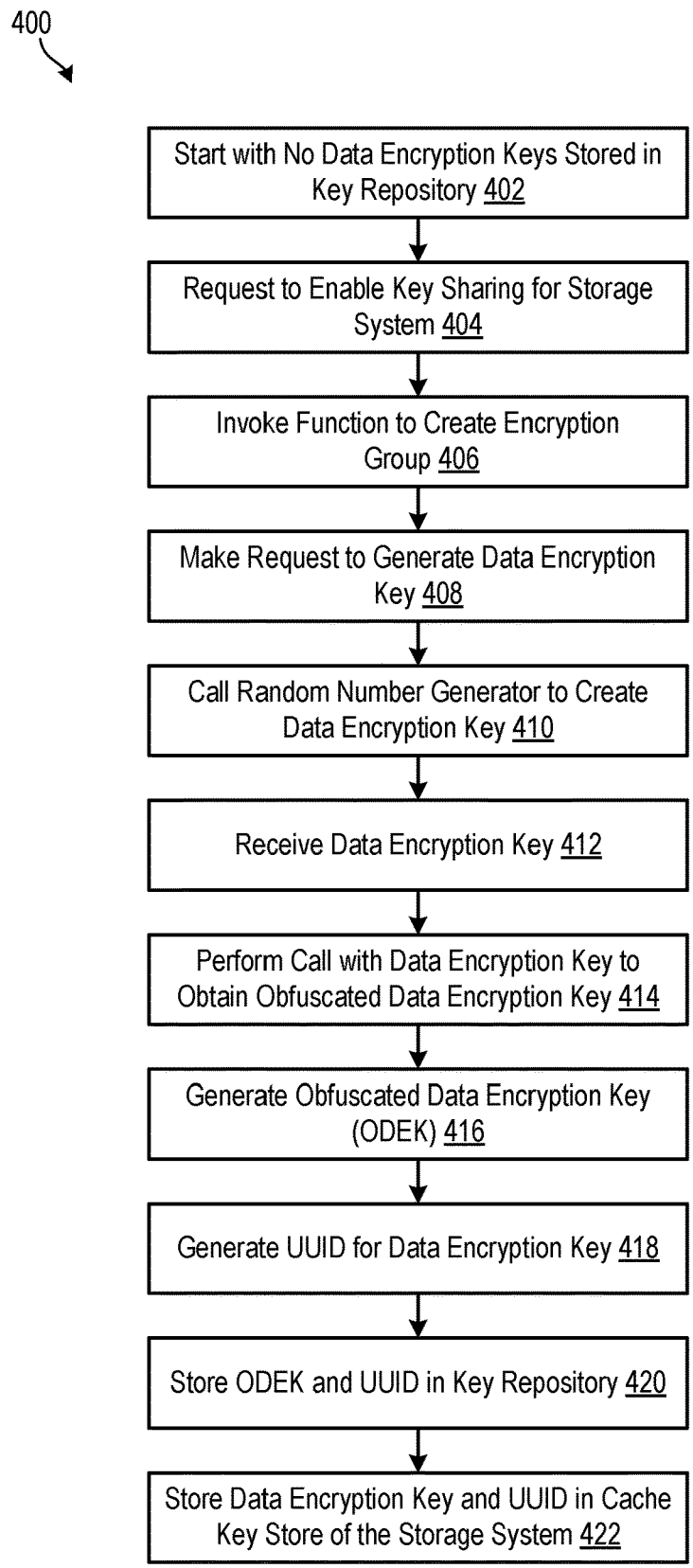
FIG. 4 is a flow diagram showing one embodiment of a method for enabling sharing of data encryption keys among storage systems in a key sharing network.

Referring to FIG. 4, one embodiment of a method 400 for enabling sharing of data encryption keys 312 among storage systems 110 in a key sharing network 320 is illustrated. As shown, the method 400 starts 402 with a storage system 110 that has no data encryption keys 312 (or obfuscated data encryption keys 308) stored in its key repository 300 and the storage system 110 is not part of a key sharing network 320. A request is made 404 to enable key sharing for the storage system 110 and the method 400 invokes 406 a function to create an encryption group (i.e., a key sharing network 320) including the storage system 110. A request is then made 408 for the storage system 110 to generate a data encryption key 312. To accomplish this, the method 400 calls 410 a random number generator to create a data encryption key 312 and the storage system 110 receives the data encryption key 312. A call is then made 414 to obtain an obfuscated data encryption key 308 from the data encryption key 312 generated at step 410. An obfuscated data encryption key 308 is then generated 416. A UUID 306 is also generated 418 for the obfuscated data encryption key 308. The UUID 306 and obfuscated data encryption key 308 are then stored 420 in the key repository 300 of the storage system 110, as shown in FIG. 3. The UUID 306 and the data encryption key 312 are also stored in the cache 304 of the storage system 110, as also shown in FIG. 3.

Figure 5:
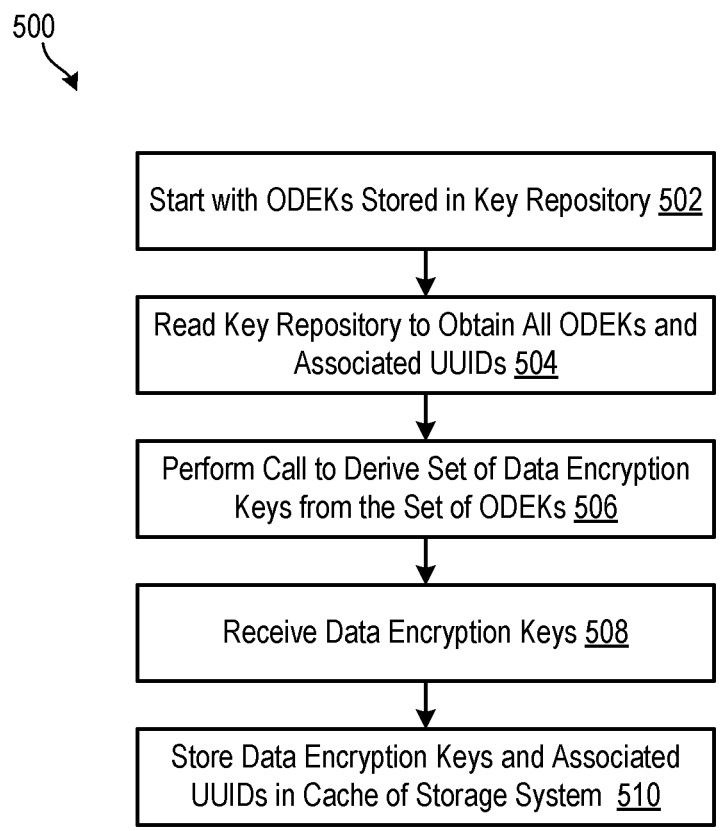
FIG. 5 is a flow diagram showing one embodiment of a method for enabling sharing of data encryption keys upon booting up a storage system.

Referring to FIG. 5, one embodiment of a method 500 for enabling sharing of data encryption keys 312 when booting up a storage system 110 is illustrated. This method 500 may be executed when a storage system 110 is booted up to achieve the configuration shown in FIG. 3. In general, the method 500 retrieves data from persistent storage (i.e., the key repository 300) to populate volatile storage such as the cache 304.

As shown, the method 500 starts 502 with a storage system 110 that has obfuscated data encryption keys 308 stored in its key repository 300. The storage system 110 then reads 504 the key repository 300 to obtain all obfuscated data encryption keys 308 and associated UUIDs 306 therein. The method 500 then performs 506 a call to derive a set of data encryption keys 312 from the set of obfuscated data encryption keys 308. The method 500 then receives 508 the data encryption keys 312 and stores 510 the data encryption keys 312 and associated UUIDs 306 in cache 304 of the storage system 110.

Figure 6:
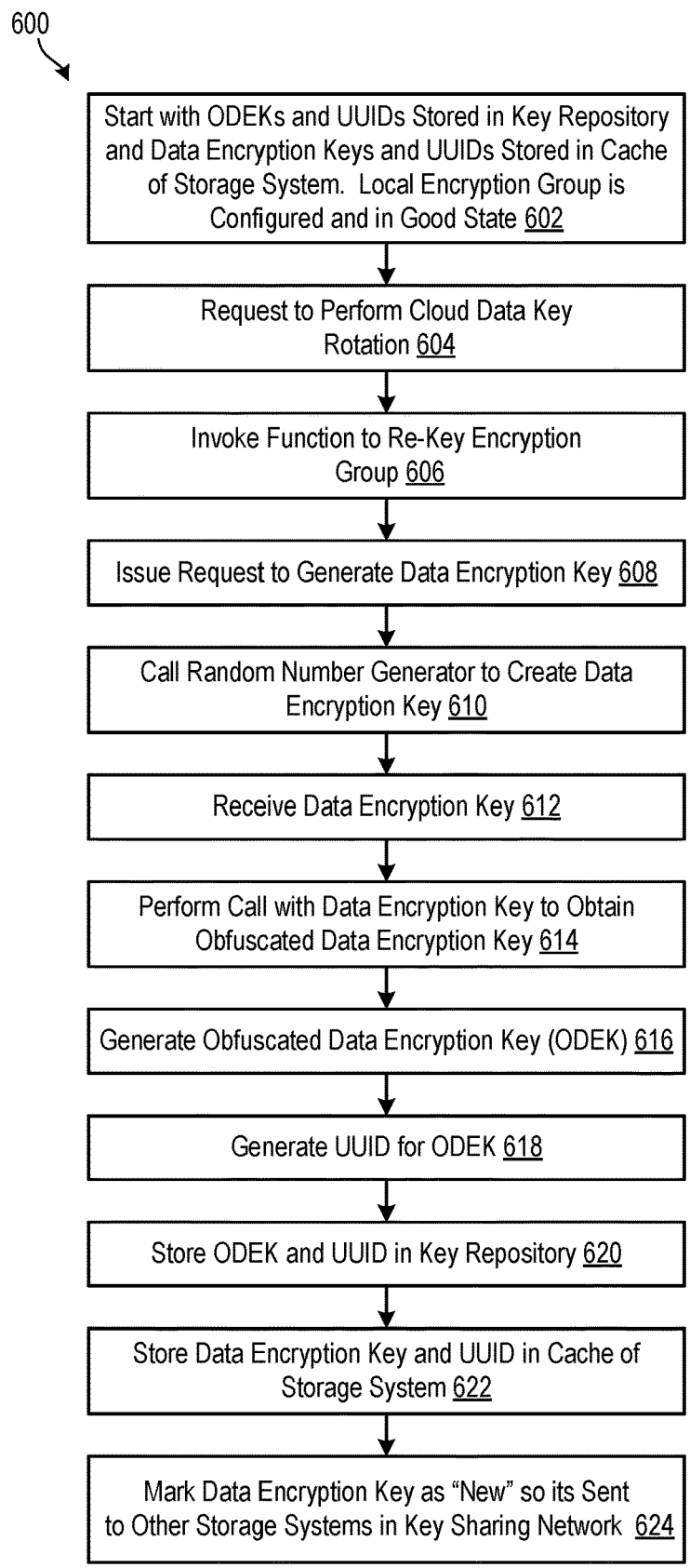
FIG. 6 is a flow diagram showing one embodiment of a method for periodically changing a data encryption key of a storage system.

Referring to FIG. 6, one embodiment of a method 600 for periodically changing (i.e., rotating) a data encryption key 312 of a storage system 110 is illustrated. As shown, the method 600 assumes 602 that a storage system 110 in a key sharing network 320 starts with obfuscated data encryption keys 308 and UUIDs 306 in its key repository 300 and data encryption keys 312 and UUIDs 306 in its cache 304. The method 600 also assumes 602 the local encryption group (i.e., key sharing network 320) is configured and in a good state.

As shown, a request is made 604 to perform cloud data key rotation for the storage system 110. A function is then invoked 606 to re-key the encryption group. The method 600 then issues 608 a request to generate a data encryption key 312. This calls 610 a random number generator to generate the data encryption key 312 and the storage system 110 that is being re-keyed receives 612 the data encryption key 312. A call is then made 614 to generate an obfuscated data encryption key 308 from the data encryption key 312. This generates 616 the obfuscated data encryption key 308 and generates 618 the UUID 306 for the obfuscated data encryption key 308. The obfuscated data encryption key 308 and associated UUID 306 are then stored 620 in the key repository 300 of the storage system 110 being re-keyed. The data encryption key 312 and associated UUID 306 are stored 622 in cache 304 of the storage system 110. The data encryption key 312 is also marked 624 as "new" so that it is replicated to other storage systems 110 in the key sharing network 320. This allows the other storage systems 110 to update their key repositories 300 and cache 304 to include the new data encryption key 312.

Figure 7:
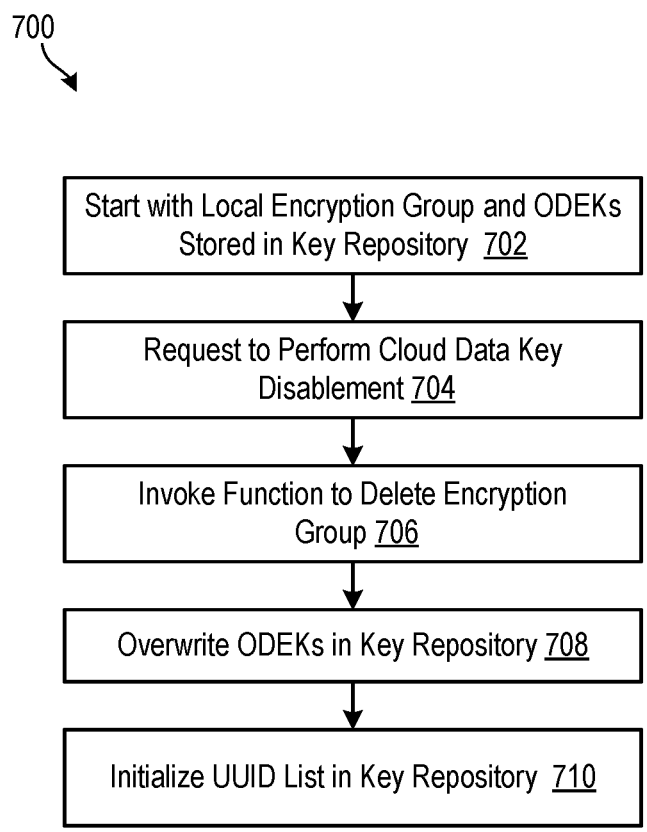
FIG. 7 is a flow diagram showing one embodiment of a method for disabling or erasing a data encryption key on a storage system.

Referring to FIG. 7, one embodiment of a method 700 for disabling or erasing data encryption keys 312 on a storage system 110 is illustrated. The method 700 assumes 702 that the storage system 110 having its data encryption keys 312 disabled starts 702 with a local encryption group and obfuscated data encryption keys 308 stored in its key repository 300. As shown, a request is made 704 to perform cloud data key disablement on the storage system 110. A function is then invoked 706 to delete the encryption group for the storage system 110. The obfuscated data encryption keys 308 are then overwritten 708 in the key repository 300 of the storage system 110, such as by overwriting all zeros in the key repository 300. A UUID list in the key repository 300 is then initialized 710, thereby overwriting any UUIDs 306.

In certain embodiments, the method 700 is modified to check whether the storage system 110 that is having its data encryption keys 312 disabled is the last storage system 110 in the key sharing network 320. If so, the request to perform cloud data key disablement may be denied. This will ensure that all copies of data encryption keys 312 are not erased from a key sharing network 320 and thereby result in irretrievable data loss.

Figure 8:
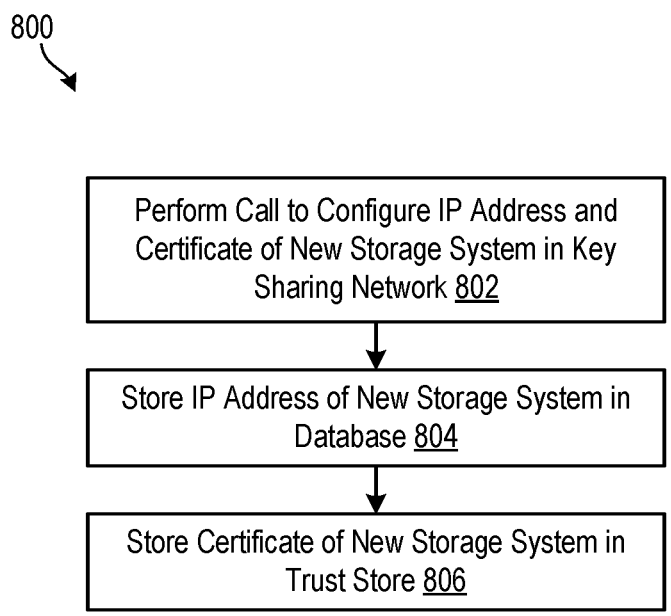
FIG. 8 is a flow diagram showing one embodiment of a method for setting up a storage system to securely communicate with another storage system in a key sharing network.

Referring to FIG. 8, one embodiment of a method 800 for setting up a storage system 110 to securely communicate with a new storage system 110 in a key sharing network 320 is illustrated. As shown, the method 800 initially performs 802 a call to configure an IP and port address and certificate for the new storage system 110 that is being added to the key sharing network 320. The method 800 then stores 804 the IP and port address of the new storage system 110 in a database of the existing storage system 110. The method 800 also stores 806 the certificate of the new storage system 110 in a trust store of the existing storage system 110.

Figure 9:
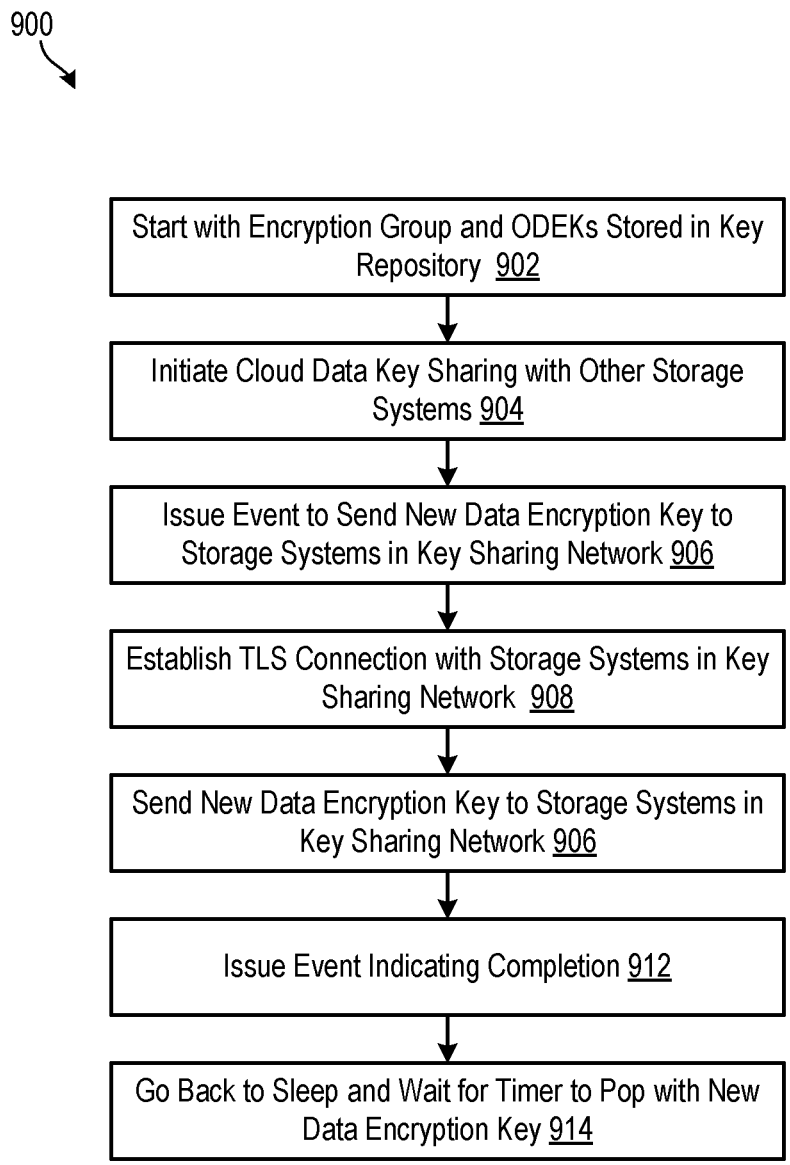
FIG. 9 is a flow diagram showing one embodiment of a method for sharing a data encryption key of a storage system with other storage systems in a key sharing network.

Referring to FIG. 9, one embodiment of a method 900 for sharing a data encryption key 312 of a storage system 110 with other storage systems 110 in a key sharing network 320 is illustrated. As shown, the method 900 initially starts 902 with an encryption group (i.e., a key sharing network 320) and obfuscated data encryption keys 308 stored in a key repository 300 of a storage system 110. As shown, the method 900 initiates 904 cloud data key sharing with other storage system 110 in the key sharing network 320. The method 900 then issues 906 an event to send a new data encryption key 312 to storage systems 110 in the key sharing network 320.

At this point, the method 900 establishes 908 a TLS connection with each storage system 110 in the key sharing network 320 and sends 906 the new data encryption key 312 to the storage systems 110 over the TLS connection. The method 900 then issues 912 an event indicating completion and goes 914 back to sleep to wait for a timer to pop with a new data encryption key 312 for sending to the storage systems 110 of the key sharing network 320.

Figure 10:
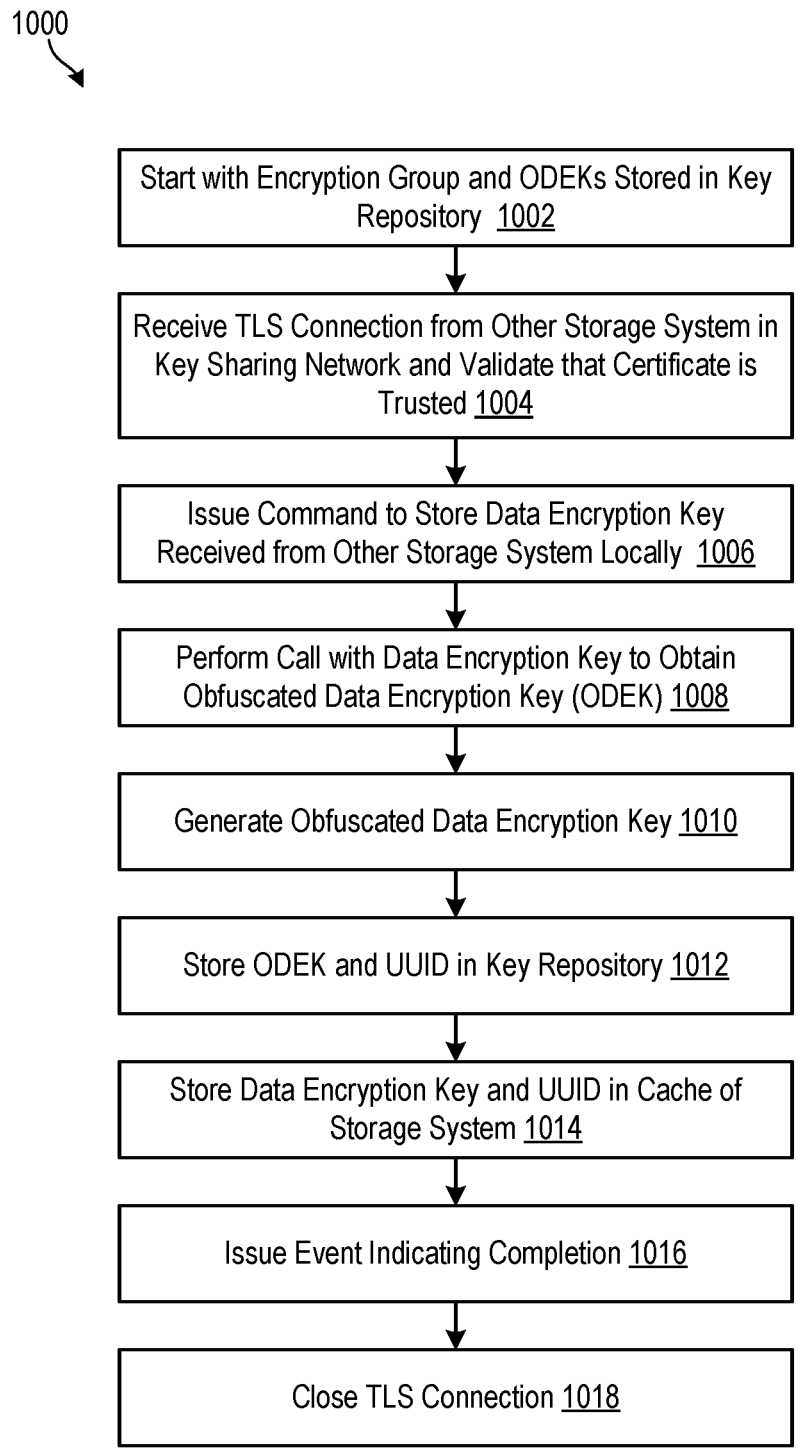
FIG. 10 is a flow diagram showing one embodiment of a method for receiving, by a storage system in a key sharing network, a data encryption key from another storage system in the key sharing network.

Referring to FIG. 10, one embodiment of a method 1000 for receiving, by a storage system 110 in a key sharing network 320, a data encryption key 312 from another storage system 110 in the key sharing network 320 is illustrated. As shown, method 1000 initially starts 1002 with an encryption group (i.e., a key sharing network 320) and obfuscated data encryption keys 308 stored in a key repository 300 of a storage system 110. The storage system 110 receives 1004 a TLS connection from another storage system 110 in the key sharing network 320 and validates 1004 that the certificate from the storage system 110 is trusted. The storage system 110 then issues 1006 a command to store a data encryption key 312 received from the other storage system 110 locally. The storage system 110 then performs 1008 a call to convert the data encryption key 312 to an obfuscated data encryption key 308. The storage system 110 then generates 1010 the obfuscated data encryption key 308 and stores 1012 the obfuscated data encryption key 308 in its key repository 300. The data encryption key 312 and associated UUID may also be stored in the cache 304. The storage system 110 then issues 1016 an event indicating completion of the data encryption key 312 reception and closes 1018 the TLS connection.

Figure 11:
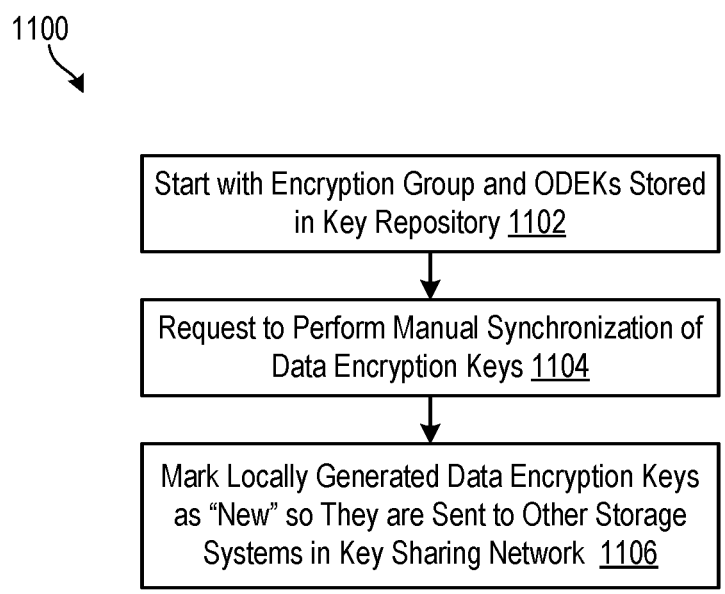
FIG. 11 is a flow diagram showing one embodiment of a method for synchronizing data encryption keys between storage systems in a key sharing network.

Referring to FIG. 11, one embodiment of a method 1100 for synchronizing data encryption keys 312 between storage systems 110 in a key sharing network 320 is illustrated. As shown, the method 1100 initially starts 1102 with an encryption group (i.e., a key sharing network 320) and obfuscated data encryption keys 308 stored in a key repository 300 of a storage system 110. The storage system 110 then issues 1104 a request to perform manual synchronization of data encryption keys 312 stored in its key repository 300. The storage system 110 then marks 1106 all locally generated data encryption keys 312 as "new" so that the data encryption keys 312 are sent to other storage systems 110 in the key sharing network 320.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

Several examples will now be provided to further clarify various aspects of the present disclosure:

Example 1: A method for sharing data encryption keys among a plurality of storage systems includes generating, by a first storage system, a data encryption key for encrypting data sent from the first storage system to cloud storage. The method stores the encrypted data in the cloud storage in the form of an encrypted data object. The method replicates, from the first storage system to a second storage system, the data encryption key. The second storage system retrieves the encrypted data object from the cloud storage and decrypts the encrypted data in the encrypted data object using the data encryption key received from the first storage system.

Example 2: The limitations of Example 1, wherein the first storage system and the second storage system belong to a key sharing network.

Example 3: The limitations of Example 2, further comprising adding a third storage system to the key sharing network and synchronizing the data encryption keys from the first storage system and the second storage system to the third storage system.

Example 4: The limitations of any of Examples 1-3, wherein each of the first storage system and the second storage system store the Internet Protocol (IP) and port address of the other.

Example 5: The limitations of any of Examples 1-4, wherein each of the first storage system and the second storage system utilize Transport Layer Security (TLS) to communicate data encryption keys to the other.

Example 6: The limitations of any of Examples 1-5, wherein each of the first storage system and the second storage system utilize at least one of a Trusted Platform Module and a Hardware Security Module to store data encryption keys thereon.

Example 7: The limitations of any of Examples 1-6, further comprising, upon updating data encryption keys by either of the first storage system and the second storage system, automatically sending the updated data encryption keys to the other storage system.

Example 8: A system comprising one or more processor and one or more computer-readable storage media collectively storing program instructions which, when executed by the processor, are configured to cause the processor to perform a method according to any of Examples 1-7.

Example 9: A computer program product comprising one or more computer readable storage media, and program instructions collectively stored on the one or more computer readable storage media, the program instructions comprising instructions configured to cause one or more processors to perform a method according to any one of Examples 1-7.

Example 10: A method for sharing data encryption keys among a plurality of storage systems includes generating, by a first storage system, a data encryption key for encrypting data sent from the first storage system to cloud storage. The method stores the encrypted data in the cloud storage in the form of an encrypted data object. The first storage system stores an Internet Protocol (IP) and port address of a second storage system belonging to a same key sharing network as the first storage system. The method replicates, from the first storage system to the second storage system, the data encryption key using the IP and port address. The second storage system retrieves the encrypted data object from the cloud storage and decrypts the encrypted data in the encrypted data object using the data encryption key received from the first storage system.

Example 11: The limitations of Example 10, further comprising adding a third storage system to the key sharing network and synchronizing the data encryption keys from the first storage system and the second storage system to the third storage system.

Example 12: The limitations of any of Examples 10 and 11, wherein each of the first storage system and the second storage system utilize Transport Layer Security (TLS) to communicate data encryption keys to the other.

Example 13: A system comprising one or more processor and one or more computer-readable storage media collectively storing program instructions which, when executed by the processor, are configured to cause the processor to perform a method according to any of Examples 10-12.

Example 14: A computer program product comprising one or more computer readable storage media, and program instructions collectively stored on the one or more computer readable storage media, the program instructions comprising instructions configured to cause one or more processors to perform a method according to any one of Examples 10-12.

The invention claimed is:

1. A method for sharing data encryption keys among a plurality of storage systems, the method comprising:
   providing a key sharing network comprising the plurality of storage systems for accessing user-data stored in a cloud repository that is accessible to each of the storage systems in the key sharing network,
   wherein a respective storage system in the key sharing network is an independent storage system connected to one or more computers configured to store user-data on the respective storage system, and the respective storage system makes at least some of the user-data stored on the respective storage system accessible to at least one other storage system in the key sharing network via the cloud repository,
   wherein the respective storage system in the key sharing network includes an encryption engine to independently generate data encryption keys for securing the user-data that is made accessible by the respective storage system to the at least one other storage system in the key sharing network via the cloud repository,
   wherein the respective storage system in the key sharing network is configured to share the data encryption keys used to encrypt the user-data stored to the cloud repository with at least one other storage system in the key sharing network so as to enable the at least one other storage system to retrieve the encrypted user-data from the cloud repository and decrypt the encrypted user-data using the data encryption keys, and
   wherein the respective storage system in the key sharing network is configured to store, in a local key repository on the respective storage system, the data encryption keys independently generated by the respective storage system, as well as data encryption keys shared with the respective storage system by the at least one other storage system in the key sharing network.

2. The method of claim 1, wherein each of the storage systems in the key sharing network is configured to store data encryption keys in its local key repository in an obfuscated format.

3. The method of claim 1, wherein sharing the data encryption keys comprises maintaining the data encryption keys in a state of synchronization across the plurality of storage systems, the synchronization including:
   sending a request to each storage system in the key sharing network to perform manual synchronization of the data encryption keys; and
   responsive to receiving the request at the respective storage system, marking each locally generated data encryption key stored in the local key repository as a new data encryption key, thereby initiating a process that sends each data encryption key marked as new to the at least one other storage system in the key sharing network.

4. The method of claim 1, wherein each of the storage systems in the key sharing network store an Internet Protocol (IP) and port address of the at least one other storage system in the key sharing network.

5. The method of claim 1, wherein each of the storage systems in the key sharing network utilize Transport Layer Security (TLS) to communicate data encryption keys to the at least one other storage system in the key sharing network.

6. The method of claim 1, wherein each of the storage systems in the key sharing network utilize at least one of a Trusted Platform Module and a Hardware Security Module to store data encryption keys thereon.

7. The method of claim 1, wherein providing the key sharing network further comprises:
   receiving, at the respective storage system, a request to form the key sharing network with the at least one other storage system;
   receiving, at the respective storage system, a request to generate one or more data encryption keys for securing the user-data made accessible by the respective storage system to the cloud repository;
   storing the one or more data encryption keys in the local key repository on the respective storage system; and sending the one or more data encryption keys to the at least one other storage system in the key sharing network, wherein each of the storage systems in the key sharing network are configured to, upon generating data encryption keys thereon, automatically send the data encryption keys to the at least one other storage system in the key sharing network.

8. A computer program product for sharing data encryption keys among a plurality of storage systems, the computer program product comprising a non-transitory computer-readable storage medium having program instructions stored thereon to perform operations comprising:
   providing a key sharing network comprising the plurality of storage systems for accessing user-data stored in a cloud repository that is accessible to each of the storage systems in the key sharing network,
   wherein a respective storage system in the key sharing network is an independent storage system connected to one or more computers configured to store user-data on the respective storage system, and the respective storage system makes at least some of the user-data stored on the respective storage system accessible to at least one other storage system in the key sharing network via the cloud repository,
   wherein the respective storage system in the key sharing network includes an encryption engine to independently generate data encryption keys for securing the user-data made accessible by the respective storage system to the at least one other storage system in the key sharing network via the cloud repository,
   wherein the respective storage system in the key sharing network is configured to share the data encryption keys used to encrypt the user-data stored to the cloud repository with the at least one other storage system in the key sharing network so as to enable the at least one other storage system to retrieve the encrypted user-data from the cloud repository and decrypt the encrypted user-data using the data encryption keys, and
   wherein the respective storage system in the key sharing network is configured to store, in a local key repository, the data encryption keys independently generated by the respective storage system, as well as data encryption keys shared with the respective storage system by the at least one other storage system in the key sharing network.

9. The computer program product of claim 8, wherein each of the storage systems in the key sharing network is configured to store data encryption keys in its local key repository in an obfuscated format.

10. The computer program product of claim 8, wherein sharing the data encryption keys comprises maintaining the data encryption keys in a state of synchronization across the plurality of storage systems.

11. The computer program product of claim 8, wherein each of the storage systems in the key sharing network store an Internet Protocol (IP) and port address of the at least one other storage system in the key sharing network.

12. The computer program product of claim 8, wherein each of the storage systems in the key sharing network utilize Transport Layer Security (TLS) to communicate data encryption keys to the at least one other storage system in the key sharing network.

13. The computer program product of claim 8, wherein each of the storage systems in the key sharing network utilize at least one of a Trusted Platform Module and a Hardware Security Module to store data encryption keys thereon.

14. The computer program product of claim 8, wherein each of the storage systems in the key sharing network are configured to, upon updating data encryption keys thereon, automatically send the updated data encryption keys to the at least one other storage system in the key sharing network.

15. A system for sharing data encryption keys among a plurality of storage systems, the system comprising:
   at least one processor; and
   at least one memory device operably coupled to the at least one processor and storing instructions for execution on the at least one processor, the instructions causing the at least one processor to:
   provide a key sharing network comprising the plurality of storage systems for accessing user-data stored in a cloud repository that is accessible to each of the storage systems in the key sharing network,
   wherein a respective storage system in the key sharing network is an independent storage system connected to one or more computers configured to store user-data on the respective storage system, and the respective storage system makes at least some of the user-data stored on the respective storage system accessible to at least one other storage system in the key sharing network via the cloud repository,
   wherein the respective storage system in the key sharing network includes an encryption engine to independently generate data encryption keys for securing the user-data made accessible by the respective storage system to the at least one other storage system in the key sharing network via the cloud repository,
   wherein the respective storage system in the key sharing network is configured to share the data encryption keys used to encrypt the user-data stored to the cloud repository with the at least one other storage system in the key sharing network so as to enable the at least one other storage system to retrieve the encrypted user-data from the cloud repository and decrypt the encrypted user-data using the data encryption keys, and
   wherein the respective storage system in the key sharing network is configured to store, in a local key repository, the data encryption keys independently generated by the respective storage system, as well as data encryption keys shared with the respective storage system by the at least one other storage system in the key sharing network.

16. The system of claim 15, wherein each of the storage systems in the key sharing network is configured to store data encryption keys in its local key repository in an obfuscated format.

17. The system of claim 15, wherein sharing the data encryption keys comprises maintaining the data encryption keys in a state of synchronization across the plurality of storage systems.

18. The system of claim 15, wherein each of the storage systems in the key sharing network store an Internet Protocol (IP) and port address of the at least one other storage system in the key sharing network.

19. The system of claim 15, wherein each of the storage systems in the key sharing network utilize Transport Layer Security (TLS) to communicate data encryption keys to the at least one other storage system in the key sharing network.

20. The system of claim 15, wherein each of the storage systems in the key sharing network utilize at least one of a Trusted Platform Module and a Hardware Security Module to store data encryption keys thereon.

21. The system of claim 15, wherein each of the storage systems in the key sharing network are configured to, upon updating data encryption keys thereon, automatically send the updated data encryption keys to the at least one other storage system in the key sharing network.

22. A method for sharing data encryption keys among a plurality of storage systems, the method comprising:
providing a key sharing network comprising the plurality of storage systems for accessing user-data stored in a cloud repository that is accessible to each of the storage systems in the key sharing network,
wherein a respective storage system in the key sharing network is an independent storage system connected to one or more computers configured to store user-data on the respective storage system, and the respective storage system makes at least some of the user-data stored on the respective storage system accessible to at least one other storage system in the key sharing network via the cloud repository,
wherein the respective storage system in the key sharing network includes an encryption engine to independently generate data encryption keys for securing the user-data made accessible by the respective storage system to the at least one other storage system in the key sharing network via the cloud repository,
wherein the respective storage system in the key sharing network is configured to share the data encryption keys used to encrypt the user-data stored to the cloud repository with at least one other storage system in the key sharing network using an Internet Protocol (IP) and port address of the at least one other storage system so as to enable the at least one other storage system to retrieve the encrypted user-data from the cloud repository and decrypt the encrypted user-data using the data encryption keys, and
wherein the respective storage system in the key sharing network is configured to store, in a local key repository, the data encryption keys independently generated by the respective storage system, as well as data encryption keys shared with the respective storage system by the at least one other storage system in the key sharing network.

23. The method of claim 22, wherein each of the storage systems in the key sharing network is configured to store data encryption keys in its local key repository in an obfuscated format.

24. The method of claim 22, wherein each of the storage systems in the key sharing network utilize Transport Layer Security (TLS) to communicate data encryption keys to the at least one other storage system in the key sharing network.

25. A system for sharing data encryption keys among a plurality of storage systems, the system comprising:
at least one processor; and
at least one memory device operably coupled to the at least one processor and storing instructions for execution on the at least one processor, the instructions causing the at least one processor to:
provide a key sharing network comprising the plurality of storage systems for accessing user-data stored in a cloud repository that is accessible to each of the storage systems in the key sharing network,
wherein a respective storage system in the key sharing network is an independent storage system connected to one or more computers configured to store user-data on the respective storage system, and the respective storage system makes at least some of the user-data stored on the respective storage system accessible to at least one other storage system in the key sharing network via the cloud repository,
wherein the respective storage system in the key sharing network includes an encryption engine to independently generate data encryption keys for securing the user-data made accessible by the respective storage system to the at least one other storage system in the key sharing network via the cloud repository,
wherein the respective storage system in the key sharing network is configured to share the data encryption keys used to encrypt the user-data stored to the cloud repository with at least one other storage system in the key sharing network using an Internet Protocol (IP) and port address of the at least one other storage system so as to enable the at least one other storage system to retrieve the encrypted user-data from the cloud repository and decrypt the encrypted user-data, and
wherein the respective storage system in the key sharing network is configured to store, in a local key repository, the data encryption keys independently generated by the respective storage system, as well as data encryption keys shared with the respective storage system by the at least one other storage system in the key sharing network.

* * * * *